Aug. 14, 1956
L. M. MARTIN
2,758,757
POWDER MEASURE AND DISPENSER
Filed July 22, 1955
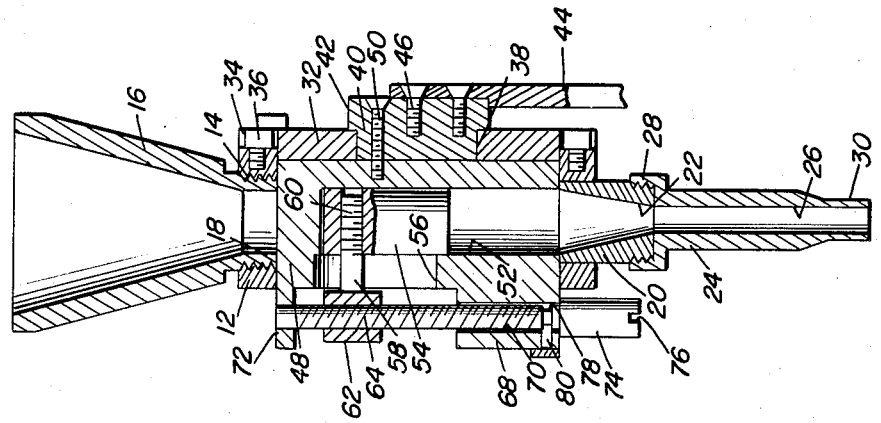
Lorin M. Martin
INVENTOR.

United States Patent Office 2,758,757
Patented Aug. 14, 1956

2,758,757

POWDER MEASURE AND DISPENSER

Lorin M. Martin, Ogden, Utah

Application July 22, 1955, Serial No. 523,787

4 Claims. (Cl. 222—308)

This invention generally relates to a measuring and dispensing device, and specifically provides an improved and novel construction in powder measures and dispensers.

In the measurement of powder forming a charge for positioning in a shell casing for subsequent firing for forcing a projectile from a gun, it is necessary that the quantity of powder dispensed into the shell casing be accurately measured since the quantity of powder determines the characteristics of the projectile when it is fired as to its trajectory. The quantity of the powder charge is generally dependent upon various factors, such as the weight of the projectile together with the particular use of the cartridges, that is, whether they are to be used in target practice or in actual hunting of game.

Accordingly, it is the primary object of the present invention to provide a powder measuring and dispensing device which will accurately and positively measure a predetermined quantity of powder and then dispense this given quantity into a shell casing.

Another object of the present invention is to provide a powder measuring and dispensing device in which the amount of powder that is measured and dispensed may be adjusted and easily determined by a simple manual adjustment.

In the construction of the present invention for accomplishing the objects, a hollow casing is provided with inlet and outlet means together with a rotatable body therein wherein the body has a blind bore therein for selective alignment with the inlet and outlet together with a slidable plug with means for adjusting the plug wherein the depth and quantity of powder will be determined by the position of the plug in the bore so that the bore may be selectively aligned with the inlet and outlet for measuring and dispensing a given amount of powder.

Other objects of the present invention will reside in its simplicity of construction, ease of operation, accurateness, ease of adjustment, its adaptation for its particular purposes, and its relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the present invention;

Figure 2 is a side elevational view of the invention looking from the other side of the device; and Figure 3 is a longitudinal, vertical sectional view taken substantially upon a plane passing along section line 3—3 of Figure 2 illustrating the internal details of construction of the invention.

With reference to the accompanying drawings, the numeral 10 generally designates the powder dispensing and measuring device of the present invention and which includes a generally cylindrical casing of annular configuration designated by the numeral 12. Screw threaded into the threaded opening 14 in the upper end of the casing 12 is a frusto-conical hollow hopper 16 having an inlet opening 18 communicating with the interior of the casing 12 and provided with an inner edge which is complementary to and shaped to conform to the inner surface of the casing 12, thereby forming a continuous smooth surface in the casing 12. The other end of the casing 12 is provided with a depending hollow projection 20 having an outlet opening 22 therein which is provided with a converging peripheral wall together with a removable adapter 24 having a longitudinal passage 26 in alignment with the passage 22 in the adapter 24. The adapter 24 is screw threaded to the projection 20, as designated by the numeral 28, and the lower end thereof is provided with a reduced external diameter 30 for engagement into the open end of a shell casing, thereby facilitating the discharge of the powder into the shell casing.

Secured to one open side of the casing 12 is a closure washer 32 having a peripheral flange 34 overlapping the casing 12 and secured thereto by fasteners 36. The washer 32 is provided with a central opening 38 receiving a cylindrical member 40 having a peripheral flange 42 engaging the outer surface of the washer 32 and including a handle 44 secured thereto by fastening means 46.

A generally cylindrical body 48 is rotatably disposed in the cylindrical casing 12 and is secured to the cylindrical member 40 by screw threaded fasteners 50, thereby detachably retaining the body 48 within the casing 12.

The body 48 is provided with a diametrically extending blind bore 52 which is in alignment with the inlet opening 18 and the outlet opening 22 in the casing 12 and will automatically be aligned therewith when turned 180° by use of the handle 44. Slidably positioned in the bore 52 is a generally elongated cylindrical plug 54 which closely fits the bore 52 and is disposed in the inner or bottom end thereof. The side wall of the body 48 is provided with an elongated slot 56 which is in communication with the inner portion of the bore 52 for accommodating an elongated rod 58 that is screw threaded to the plug adjacent the bottom end thereof with screw threads 60. The rod 58 is provided with a transverse tubular sleeve 62 on the outer end thereof which is internally screw threaded for threadedly receiving a threaded adjusting screw 64.

The side face of the body 48 having the slot 56 therein is provided with a pair of laterally extending projections 66 and 68 which have aligned bores 70 and 72 therein rotatably journaling the adjusting screw 64. The free end of the adjusting screw 64 is provided with a cylindrical headed portion 74 having a slot 76 therein for receiving a screwdriver or similar instrument. The inner end of the cylindrical headed portion 74 abuts the projection 68 adjacent the end of the bore 70. The adjusting screw 64 is provided with an annular recess 78 adjacent the headed portion thereof for receiving a keeper 80 having a U-shaped yoke on the inner end thereof for reception in the groove 78, thereby retaining the adjusting screw 64 in immovable longitudinal position. A closure plate 82 is mounted on the outer face of the projection 68 by a screw member 84 which swings to a position overlying the outer end of the keeper 80, thereby retaining the keeper in position. The keeper 80 permits rotation of the adjusting screw 64 but prevents longitudinal movement thereof wherein rotation of the adjusting screw 64 will move the rods 58 and the plug 54 in the bore 52, thereby varying the effective depth of the bore 52 for varying the quantity of powder which will be deposited in the bore 52 when the bore 52 is aligned with the inlet opening 18 of the hopper 16.

For limiting the rotational movement of the body 48, a pair of diametrically opposed stop screws 86 are provided for projecting into the path of movement of the handle 44, wherein the handle 44 will move only a distance sufficient to rotate the body 48 one-half of a revolution, or from a position in exact alignment with the inlet opening 18 in the hopper 16 to a position in exact alignment with the outlet opening 22 in the projection 20.

The body 48 is cylindrical and closely fits into the cylindrical hollow casing 12 and all of the complemental sliding contact surfaces are machine fitted, wherein the edges of the bore 52 and the edges of the inlet opening 18 will effectively cut off the powder at the desired level. Inasmuch as the powder is in the form of granules or grains and it is necessary to accurately measure much grains down to a division of a grain, such as a portion of a single grain, it will be seen that the cutting action of the edges of the bore 52 and the inlet opening 18 will effectively cut the grains of the powder wherein the dispensing device of the present invention will measure the powder to the exact one-tenth of a grain, thereby permitting the device to be adapted for various quantities of powder, wherein each measurement will be exact. All of the flanged members 32 and 40 as well as the cylindrical plug 54 and the adjusting screw 64 and its mounting means are machine fitted to assure a positive action and accurate measure of the powder. In addition, a scale may be provided on the body 48 adjacent the slot 56 in order that the particular quantity being measured and dispensed may be readily ascertained by observance of the graduations on the scale. Also, a handle 88 is provided on the casing 12 for assisting in operating the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A powder measuring and dispensing device comprising a hollow cylindrical casing, inlet means at the upper end of said casing, outlet means at the bottom of said casing, a cylindrical body rotatably mounted in said casing, said casing and body having complementary sliding surface contact, a handle on said body for rotation thereof, said body having a radially extending blind bore for selective alignment with the inlet means and the outlet means, said bore being of predetermined size for measuring and discharging a given quantity of powder, said body having a slot in the outer side thereof communicating with the bottom portion of the blind bore, a slidable plug mounted in said bore, a rod adjacent the bottom of said plug extending laterally through the slot, said rod having a screw threaded aperture in the outer end, an adjusting screw threaded through said aperture, means on said body for supporting said screw for rotation and to prevent longitudinal movement thereof for adjusting the effective depth of the bore for adjusting the measured quantity of powder.

2. A powder measuring and dispensing device comprising a hollow cylindrical casing, inlet means at the upper end of said casing, outlet means at the bottom of said casing, a cylindrical body rotatably mounted in said casing, said casing and body having complementary sliding surface contact, a handle on said body for rotation thereof, said body having a radially extending blind bore for selective alignment with the inlet means and the outlet means, said bore being of predetermined size for measuring and discharging a given quantity of powder, said body having a slot in the outer side thereof communicating with the bottom portion of the blind bore, a slidable plug mounted in said bore, a rod adjacent the bottom of said plug extending laterally through the slot, said rod having a screw threaded aperture in the outer end, an adjusting screw threaded through said aperture, means on said body for supporting said screw for rotation and to prevent longitudinal movement thereof for adjusting the effective depth of the bore for adjusting the measured quantity of powder, said inlet means including a hollow frusto-conical hopper screw threaded into an operture in the end conforming to the curvature of the hollow casing thereby providing a smooth continuous surface on the interior of the casing with the edges of the inlet opening in the bottom of the hopper slidingly contacting the edges of the bore in the body for accurately cutting the powder when the body is rotated.

3. A powder measuring and dispensing device comprising a hollow cylindrical casing, inlet means at the upper end of said casing, outlet means at the bottom of said casing, a cylindrical body rotatably mounted in said casing, said casing and body having complementary sliding surface contact, a handle on said body for rotation thereof, said body having a radially extending blind bore for selective alignment with the inlet means and the outlet means, said bore being of predetermined size for measuring and discharging a given quantity of powder, said body having a slot in the outer side thereof communicating with the bottom portion of the blind bore, a slidable plug mounted in said bore, a rod adjacent the bottom of said plug extending laterally through the slot, said rod having a screw threaded aperture in the outer end, an adjusting screw threaded through said aperture, means on said body for supporting said screw for rotation and to prevent longitudinal movement thereof for adjusting the effective depth of the bore for adjusting the measured quantity of powder, said inlet means including a hollow frusto-conical hopper screw threaded into an aperture in the end conforming to the curvature of the hollow casing thereby providing a smooth continuous surface on the interior of the casing with the edges of the inlet opening in the bottom of the hopper slidingly contacting the edges of the bore in the body for accurately cutting the powder when the body is rotated, said outlet means including an integral hollow funnel-shaped projection, and a detachable tubular adapter connected to said projection, the outer end of the adapter having a reduced external portion for guiding the powder into a shell casing.

4. A powder measuring and dispensing device comprising a hollow cylindrical casing, inlet means at the upper end of said casing, outlet means at the bottom of said casing, a cylindrical body rotatably mounted in said casing, said casing and body having complementary sliding surface contact, a handle on said body for rotation thereof, said body having a radially extending blind bore for selective alignment with the inlet means and the outlet means, said bore being of predetermined size for measuring and discharging a given quantity of powder, said casing having a pair of diametrically opposed stop members projecting from one side edge, said stop being disposed in the path of movement of the handle for limiting the movement thereof and selectively aligning the bore in the body with the inlet means and the outlet means.

References Cited in the file of this patent
UNITED STATES PATENTS

| | | |
|---|---|---|
| 1,032,736 | Brownless | July 16, 1912 |
| 2,550,827 | Lachmiller | May 1, 1951 |